(12) United States Patent
Moreno et al.

(10) Patent No.: US 11,435,722 B2
(45) Date of Patent: Sep. 6, 2022

(54) SUBSEA SMART ELECTRIC CONTROL UNIT

(71) Applicant: Safe Marine Transfer, LLC, Houston, TX (US)

(72) Inventors: Paul Moreno, Houston, TX (US); Matt York, Houston, TX (US); Tom A. Gay, Houston, TX (US); Art J. Schroeder, Jr., Houston, TX (US); James E. Chitwood, Spring, TX (US)

(73) Assignee: SAFE MARINE TRANSFER, LLC, Houston, TX (US)

( * ) Notice: Subject to any disclaimer, the term of this patent is extended or adjusted under 35 U.S.C. 154(b) by 38 days.

(21) Appl. No.: 16/962,068

(22) PCT Filed: Jan. 18, 2019

(86) PCT No.: PCT/US2019/014291
§ 371 (c)(1),
(2) Date: Jul. 14, 2020

(87) PCT Pub. No.: WO2019/144003
PCT Pub. Date: Jul. 25, 2019

(65) Prior Publication Data
US 2020/0348648 A1   Nov. 5, 2020

Related U.S. Application Data

(60) Provisional application No. 62/618,903, filed on Jan. 18, 2018.

(51) Int. Cl.
*E21B 41/00* (2006.01)
*G05B 19/4155* (2006.01)

(52) U.S. Cl.
CPC ...... *G05B 19/4155* (2013.01); *E21B 41/0007* (2013.01); *G05B 2219/40271* (2013.01)

(58) Field of Classification Search
CPC ............ E21B 33/0355; E21B 41/0007; G05B 19/4155; G05B 2219/40271
See application file for complete search history.

(56) References Cited

U.S. PATENT DOCUMENTS 5,166,677 A * 11/1992 Schoenberg ........ E21B 33/0355
166/335
6,257,549 B1 * 7/2001 Hopper ..................... H02J 9/06
251/129.11

(Continued)

FOREIGN PATENT DOCUMENTS

| WO | 2013117202 A1 | 8/2013 |
| WO | 2014079476 A1 | 5/2014 |

(Continued)

*Primary Examiner* — Matthew R Buck
(74) *Attorney, Agent, or Firm* — Osha Bergman Watanabe & Burton LLP

(57) ABSTRACT

A process and smart controller for controlling a subsea smart electrical control unit. The process including collecting operating data from one or more devices and one or more control end points, calculating and performing in-situ analytics, and reporting a health and a status of the one or more devices and one or more control end points. The smart controller including one or more external sensors that create local control loops for real time operation, adjustment, and optimization of the controlled end device, wherein the external sensors are used with a smart controller to create one or more control loops.

17 Claims, 2 Drawing Sheets

(56) References Cited

U.S. PATENT DOCUMENTS

| | | | | |
|---|---|---|---|---|
| 6,595,487 | B2* | 7/2003 | Johansen | F16K 31/04 |
| | | | | 251/129.04 |
| 8,281,863 | B2* | 10/2012 | Voss | F16K 3/0254 |
| | | | | 166/351 |
| 8,973,451 | B2* | 3/2015 | Oswald | E21B 33/0355 |
| | | | | 74/89.25 |
| 8,978,687 | B2* | 3/2015 | Lenz | F16K 31/504 |
| | | | | 137/81.2 |
| 9,222,555 | B2* | 12/2015 | Morin | F16H 37/041 |
| 9,376,894 | B2* | 6/2016 | Abicht | E21B 43/12 |
| 9,920,852 | B2* | 3/2018 | Garrone | F16K 31/047 |
| 9,926,770 | B1* | 3/2018 | Illakowicz | H02K 5/225 |
| 10,808,485 | B2* | 10/2020 | Phielipeit-Spiess | E21B 34/04 |
| 2009/0277644 | A1* | 11/2009 | McStay | E21B 33/035 |
| | | | | 166/336 |
| 2015/0104328 | A1 | 4/2015 | Babbitt et al. | |
| 2016/0138358 | A1 | 5/2016 | Whitby et al. | |

FOREIGN PATENT DOCUMENTS

| | | | |
|---|---|---|---|
| WO | 2015040476 | A2 | 3/2015 |
| WO | WO-2018089173 | A1 * | 5/2018 |

* cited by examiner

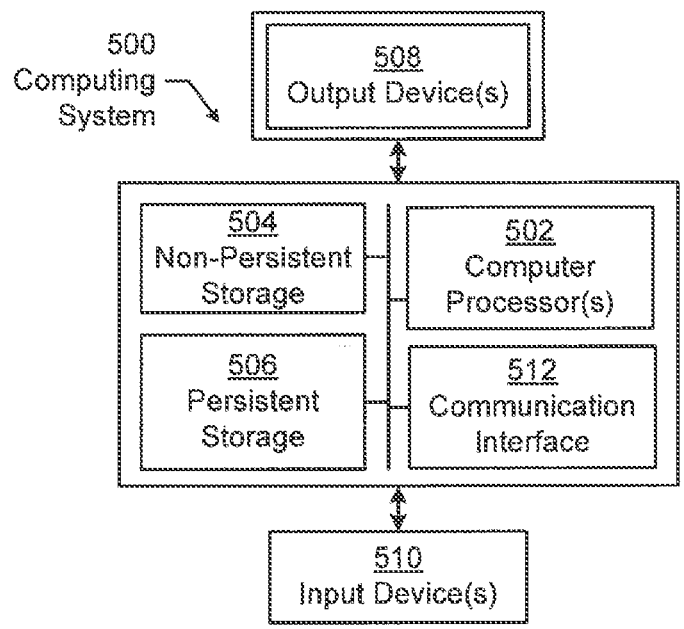
FIG. 2.1
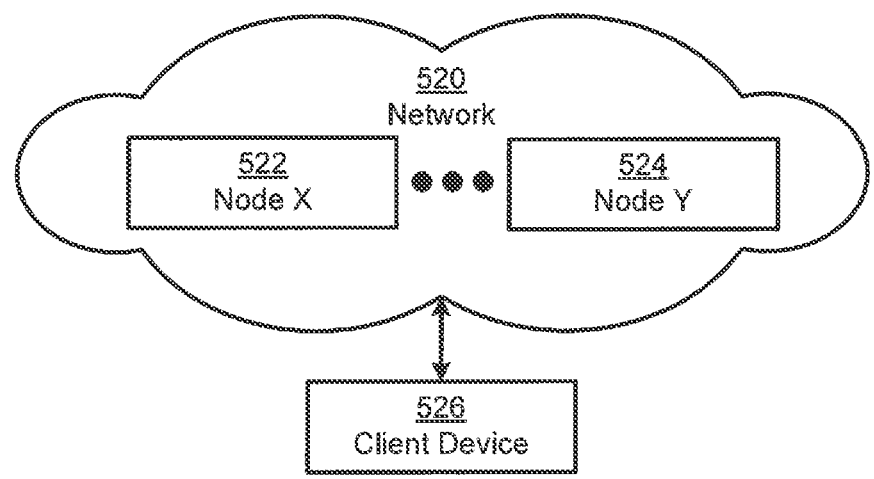
FIG. 2.2

SUBSEA SMART ELECTRIC CONTROL UNIT

BACKGROUND

Subsea production and processes have progressed to date utilizing hydraulic and more recently electro-hydraulic control and umbilical tube based chemical injection systems. Unfortunately, these systems are very complex and expensive to deploy, maintain and repair. Also, there is an inherent latency in current control systems which offers little information in a feedback loop.

SUMMARY OF THE CLAIMED EMBODIMENTS

In one aspect, embodiments disclosed herein relate to a process for monitoring, analyzing, and controlling one or more end devices utilized in subsea production via a subsea smart electrical control unit. The process includes collecting sensed operating data from one or more devices and one or more control end points, calculating and performing in-situ analytics, and reporting back to operations and other personnel a health and a status of the one or more devices and one or more control end points.

In another aspect, embodiments disclosed herein relate to a subsea smart electric control unit having one or more external sensors configured to create local control loops for real time operation, adjustment, and optimization of the controlled end device. The external sensors are used with a smart controller to create one or more control loops. The one or more control loops may be an on-off control, linear or non-linear feedback control loops, PID process control, feed-forward control strategies, artificial intelligence, fuzzy logic control, kalman filters, sliding mode control, dynamic programming, adaptive control, and economic optimization with dynamic control.

Other aspects and advantages will be apparent from the following description and the appended claims.

BRIEF DESCRIPTION OF DRAWINGS

FIGS. 2.1 and 2.2 show a computing system according to one or more embodiments.

DETAILED DESCRIPTION

Figure 1:
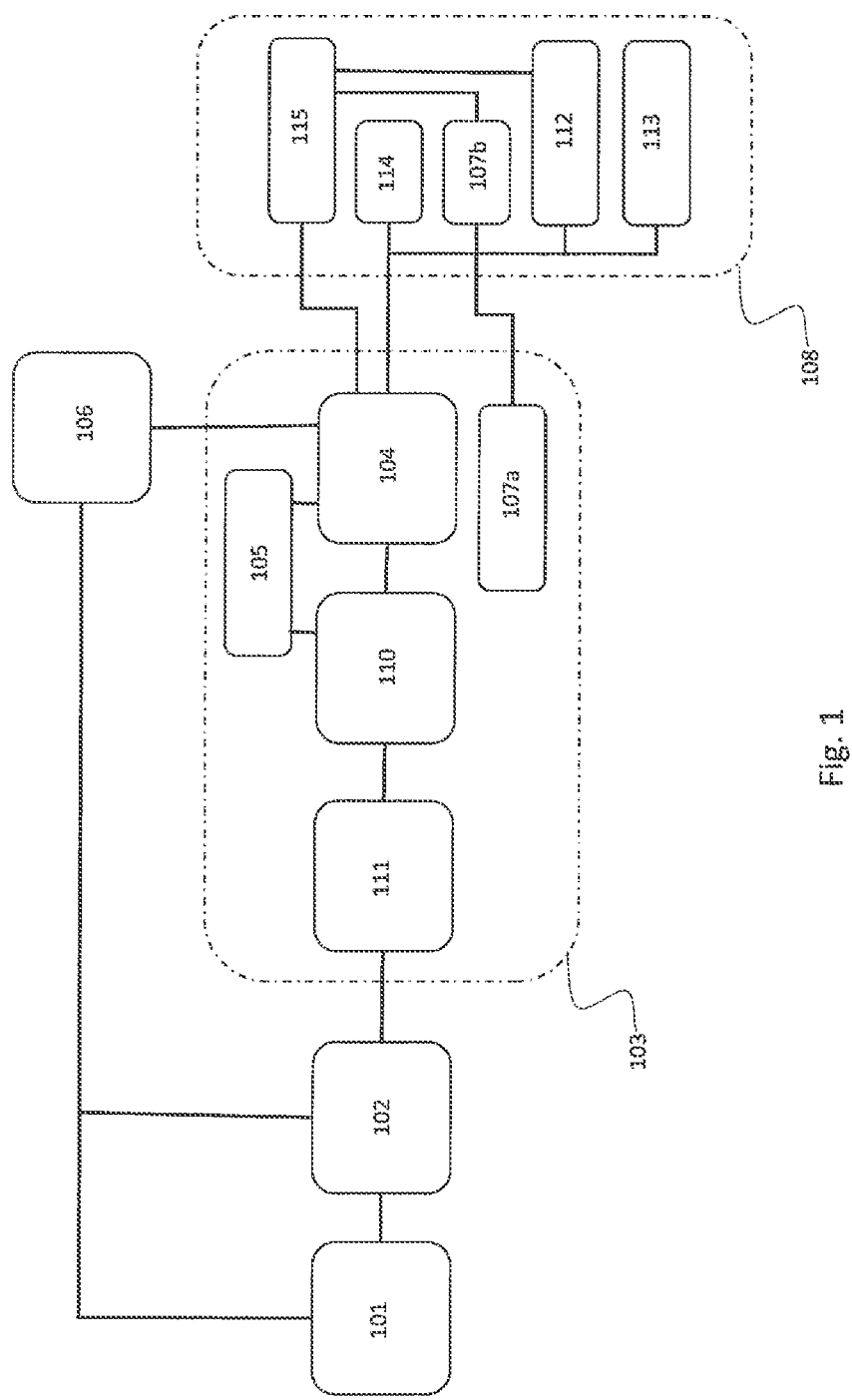
FIG. 1 is an illustration of a subsea smart electrical control unit according to embodiments disclosed herein.

In one or more embodiments disclosed herein, is an all-electric control system featuring lower costs, greater capability and reliability with simplicity unachievable with conventional electro-hydraulic controls. The smart electric control unit may be capable of serving the various needs of rotary and linear motions, providing smart control of the end devices. The integration of such an electric control unit with a smart battery and charger system which, when operating together, enables a subsea fail-to-a-preferred condition capability.

Such a smart electric control unit may be capable of operating various subsea processes using a wireless, or umbilical link. The smart electrical control unit may also be equipped with the necessary power, monitoring, control, and redundancy processes to operate subsea for extended period of time.

In one aspect, embodiments herein relate to a subsea smart electric control unit. The subsea smart electrical control unit may be springless, pressure compensated up to 10,000 feet of seawater (fsw), electrically operated with a smart battery, and have a control and monitoring system which may not require an HPU (hydraulic power unit). The subsea smart electrical control unit may also have one or more actuating valves (gate, ball, etc.) with a fail-to-specified position (open, close, or as is). Such actuating valves, may enable the subsea process to continue to operate in the event of a communications or power failure to the subsea smart electrical control unit.

In one or more embodiments, the subsea smart electric control unit may be connected to a meter and/or pump, via one or more actuatable valves, and utilized for flow control. The subsea smart electric control unit may also be equipped with one or more sensors that may monitor, analyze, and report health and status of a subsea end device, such as the one or more actuatable valves. The one or more sensors may be controlled by a control unit which may be part of a modular housing forming part of the overall subsea smart electric control unit.

The subsea smart electric control unit may be used to set up a process control loop for subsea processing, such as a level controller for a subsea separator or surge control for a subsea compressor. The subsea smart electric control unit may be used to remotely adjust a pressure regulator such as a production choke or hydraulic pressure regulator. Further, the subsea smart electric control unit may be capable of operating a valve, or other metering device, to regulate the injection of a liquid or slurry to subsea point of injection.

The subsea smart electric control unit as illustrated in FIG. 1 may be a modular pressure compensated unit that provides rotary, or linear, motion to function for an assortment of end devices (101). Such end devices (101) may include quarter-turn, 180 degree, and other positional devices like ball and plug valves, multi-turn devices like gate and needle valves, pressure chokes, and adjustable regulators, mechanical actuators such as screw drive actuators for mechanical locks, etc., and continuous rotation devices like pump drives. Further, more than one of such end devices (101) may be located subsea, or as part of the subsea smart electric control unit, and may be used simultaneously to operate multiple processes at once, or in succession.

The basic unit configuration may be capable of operational flexibility due to a smart controller (104) which, depending upon its programming may operate the respective devices (101) as needed. Further, as will be described below, the subsea smart electrical control unit may be equipped with sufficient power to maintain operations, control, and monitoring of multiple end devices (101).

The end point devices (101) may have mechanical interfaces (102) which may connect the electric control unit and the end point devices (101). This mechanical interface (102) may be a fixed mounting or a relocatable design. In all cases, the mountings may react to the rotational torque generated by the unit to operate the end device (101). Some embodiments of this mechanical interface may include a torque resistant hard stop (not shown) to prevent over-extending the operating range of the end device (101) in a contingency situation. This mechanical interface, in some embodiments, may have a visual position indicator so that a visual inspection by an ROV, AUV, or diver, for example, may provide independent confirmation of the rotational position of the unit.

Additionally, the mechanical interface (102) may be a relocatable mounting device. Such a relocatable mounting device may, in some embodiments, enable the subsea smart electric control unit to be repositioned to another end device, or be removed for replacement of the control unit subsea by an appropriate ROV. In some embodiments, the end devices may require a linear motion rather than rotary motions. The relocatable mounting device of the mechanical interface (102) may enable for a rapid changing from linear motion to rotary motion, as needed based on the end unit (101) being used.

The subsea smart electric control unit may be contained within the modular housing (103). The core may include an electric motor (110) and gearbox (111), as may be required, together with a smart controller (104). In some embodiments, the gearbox may not be necessary. The entire modular housing and core unit may be completely filled with a dielectric fluid and a hydrostatic pressure compensation device (not shown) equalizes the internal and external hydrostatic pressure whenever the unit is subsea. All components within the system may be qualified to operate at hydrostatic pressures to 10,000 fsw. The unit may also be fitted within a 1 atmosphere housing rated to pressures at 10,000 fsw.

The smart controller (104) may operate the electric motor (110) controlling the torque, RPMs and total turns using integrated internal sensors (105) to monitor the appropriate data for controlled and repeatable operation of the attached end device. The end device (101) may also be equipped with one or more external sensors (106) to collect operating data, analyze the information, and infer the end device's health condition enabling timely scheduled maintenance, if required.

The smart controller (104) may also be utilized to define profiles for valve operation in terms of positional and torque limits. This may include warnings on high running torque or high breakout torque. In another embodiment, one or more external sensors (106) for example, downstream production pressure, provide external information to the smart controller for establishing a feedback loop. This external feedback loop may enable active remote control of end devices (101) such as production chokes, remote adjustment of hydraulic pressure regulators and similar devices.

The smart controller (104) may be a programmable module that is capable of both distributed as well as local computing capabilities. Some programmable modules can be used with their provided software for programing and controlling the motors as well as providing feedback. The programmable module may be a custom designed SIL 3 module, utilizing for example software such as LabVIEW, C+, Python and others. For example, the programmable module may be an Elmo controller, or other type of controller as needed.

The smart controller (104) may be a computing system similar to the computing system described in FIGS. 2.1 and 2.2 and the accompanying description. Embodiments may be implemented on such a computing system. Any combination of server, router, switch, embedded device, or other types of hardware may be used. For example, as shown in FIG. 2.1, the smart controller (104) may be the computing system (500), which may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network. (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506), Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (500) in FIG. 2A may be connected to, or be a part of, a network. For example, as shown in FIG. 2.2, the network (520) may include multiple nodes (e.g., node X (522), node Y (524)). Each node may correspond to a computing system, such as the computing system shown in FIG. 2.1, or a group of nodes combined may correspond to the computing system shown in FIG. 2.1 By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 2.2, the node may correspond to a blade in a server chassis that is connected to other nodes via a backplane. By way of another example, the node may correspond to a server in a data center. By way of another example, the node may correspond to a computer processor or a micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 2.1. Further, the client device (526) may include and/or perform all or a portion of one or more embodiments of the disclosure.

The computing system or group of computing systems described in FIGS. 2.1 and 2.2 may include functionality to perform a variety of operations disclosed herein. For example, the computing system(s) may perform communication between processes on the same or different systems, such as the subsea smart electrical control unit, the internal and external sensors, the end points, subsea and surface communications, batteries and electrical power, etc. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting, examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Rather than, or in addition to, sharing data between processes, the computing system performing one or more embodiments of the disclosure may include functionality to receive data from a user or from the subsea equipment. For example, in one or more embodiments, a user may submit data via a graphical user interface (GUI) on the end device. Data may be submitted via the graphical user interface by a user selecting one or more graphical user interface widgets or inserting text and other data into graphical user interface widgets using a touchpad, a keyboard, a mouse, or any other input device. In response to selecting a particular item, infolluation regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) lire within a web client of the user device, thereby initiating a Hypertext Transfer Protocol (HTTP) or other protocol request being sent to the network host associated with the URL in response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from die server after selecting the URL link nay provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data.

The extracted data may be used for further processing by the computing system. For example, the computing system of FIG. 2.1, while performing one or more embodiments of the disclosure, may perform data comparison, control loops, or data acquisition.

The computing system in FIG. 2.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 2.1 may include functionality to present raw and/or processed data, such as results of comparisons and other processing. For example, presenting data may be accomplished through various presenting methods, Specifically, data may be presented through a user interface provided by a computing device. The user interface may include a GUI that displays information on a display device, such as a remote computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

The above description of functions presents only a few examples of functions performed by the computing system of FIG. 2.1 and the nodes and/or client device in FIG. 2.2. Other functions may be performed using one or more embodiments of the disclosure.

Returning now to FIG. 1, the electric power and control module (108) may feature the computer interface necessary to communicate with a host offshore platform using industry standard communications protocol. Electric power, via the smart battery (107a, 107b), umbilical (112), or other power source (113), and control communications (115) may be delivered either through an umbilical (112) or from some other source like a sea-surface buoy. Whatever the source, the power and communications may be conditioned, in power conditioning unit (114), to be used by the smart controller (104) and other components within the modular housing (103). Such a power condition unit (114) may include a voltage regulator, resistor, capacitor, or other such devices capable of regulating a power supply.

Power continuity may be assured through the use of a smart battery (107a, 107b) which can be sized and configured to meet industry safety standards for total number of cycles. The smart battery (107a, 107b) may be integrated and located within the modular housing unit (103) as smart battery (107a) or it may be located independently in the electric power and control module (108) as smart battery (107b) where multiple system units may utilize a common smart battery. The smart battery (107a, 107b) may be maintained with a trickle charge through the umbilical (112) and the battery may effectively average the power load from the source. In this way, recharging is actively managed by the smart battery's own controller that monitors and reports the health condition of the smart battery (107a, 107b). The smart battery (107a, 107b) may be commercially rated as a SIL 2 device. Further, the smart battery (1.07a, 107b) may be sized appropriately to provide power to all end points (101) to return them to the fail-to-desired position in the event of an umbilical power or communications failure.

Accordingly, by including the smart battery (1.07a, 107b) to provide energy, any loss of supply power from the umbilical (112) or control communications (115) to the smart controller (104) may provide a fail-to-specified condition to the end point device (101). For example, a fail-to-closed position may be specified, such that in the event of a power failure, the smart battery (107a, 107b) and smart controller (104) may close an end unit (101) valve and may prevent the over injection of liquids into the subsea point of consumption. Accordingly, this configuration of the subsea smart battery (107a, 107b) and smart controller (104) does not require any springs or other mechanisms for use in safety service.

Further, the smart controller (104), together with a smart battery (107a, 107b), may be configured for operation of critical safety end devices in subsea service. The subsea smart controller (104) may also be capable of putting the system in fail-to-safe condition in the event of power, communication, or other predetermined conditions programmed into the smart controller (104). The energy required to move the end device (101) to a safe condition may be provided by the smart battery (107a, 107b), storing the energy in an electro-chemical form. In this way, conventional mechanical energy storage devices like springs or HPUs are not required.)

The smart controller (104) may collect operating data from devices and control end points (101), calculate and perform in sift analytics such as high-low limit exceedance, deviation from a set point or range, wear modelling, deterioration modelling, and report the health and status of the end point unit (101) and any devices attached thereto.

In one or more embodiments, the smart controller may be equipped with external sensors to create local control loops for real time operation, adjustment, and optimization of the end point device. The external sensors may be used with the smart controller to set up appropriate control loops utilizing any number of control strategies. The control strategies may include, but not limited to, on-off control, linear or nonlinear feedback control loops, PID process control, feed-forward control strategies, artificial intelligence, fuzzy logic control, kalman filters, sliding mode control, dynamic programming, adaptive control, economic optimization with dynamic control. Such external sensors may be one or more of pressure, temperature, torque, vectoring, position, voltage, and amperage sensors.

Additionally, the smart battery may separate the peak and in-rush electrical operating loads from the power supply electrical cable. This may average the power supply transmission by locally handling electrical operating transients. This may reduce the necessary size of the power cable and reduce the need for overdesigning the cable.

The smart controller, as disclosed herein, may be used in one or more embodiments to meter a liquid for subsea well injection.

In one or more embodiments, the smart controller as disclosed herein may connect to a variable speed pump (end point (101)). For example, the smart controller may be equipped to one or more large volume liquid storage tanks that include a rigid outer container and at least one pressure balanced flexible inner container disposed within the outer container. The at least one inner container contains at least one stored liquid, such as water, chemicals, slurries, or other liquids which may be desired to be injected into a subsea well.

According to some embodiments, the at least one inner container may be able to accommodate a volume ranging up to 5,000 barrels. At least one inner container may be filled with a liquid including at least one of chemicals, fuel, hydrocarbons, muds, and slurries. As used herein, a "stored liquid" or a "liquid" may refer to liquids other than seawater or gases. For example, various liquids or gases that may be stored in at least one inner container of the present disclosure may include chemicals to be used in subsea production, such as methanol, glycol, diesel, oil, antiagglomerate hydrate inhibitors, low dosage hydrate inhibitors, slops, muds and many other possible liquids or gases. Further, liquids that may be stored in the flexible inner container(s) may include those capable of functioning deepsea hydrostatic pressure (up to 5,000 psi) and cold deepsea temperature (~34° F.), while also maintaining the flexibility of the inner container.

Using the smart controller, the stored liquid may be added or removed from the inner container through a controlled opening, and a corresponding volume of seawater may outflow or inflow from the annulus between the at least one inner container and outer container. For example, the smart controller may operate a metering system that may connect the inner container having a stored liquid therein to a subsea point of consumption. For example, a metering system may be connected to a controlled opening which may function as an inlet or outlet, depending on whether liquid is being injected into a production system or collected. The smart controller and metering system may be used to control the flow of the stored liquid into or out of the inner container.

In some embodiments, the pressure of a stored liquid may be elevated (with a metering pump) above hydrostatic pressure of the surrounding seawater for injection into an active production system. In some embodiments, a production system may be operating below hydrostatic pressure and the sea's environmental pressure may force the stored liquid from a storage tank of the present disclosure and into the production system. The smart controller may analyze the well, and adjust the pressure of the variable speed pump during injection. Further, the rate of chemical dosing or liquid injection may be controlled. For example, in some embodiments, a stored liquid may be used sparingly in a production system and dosed at a low rate with a small metering pump, while another stored liquid, such as methanol, may be dosed in large volumes and at high rates into the production system. The piping and pumping systems used in conjunction with stored liquid injection and smart controller in a production system may be sized according to the volumes and rates of the liquid being dosed.

In one or more embodiments, it may be necessary to refill the subsea storage tank while it is still subsea. In such an embodiment, a downline may be provided from a seaborne vessel to the inner container, wherein the downline includes a refill nozzle connecting the downline to the storage tank and a pressure control valve positioned at the refill nozzle. The smart controller end unit may be a pressure control valve which may control the downline outlet pressure to a maximum differential over the ambient hydrostatic pressure from the surrounding subsea environment. By controlling the downline outlet pressure to a maximum differential over the ambient hydrostatic pressure, the smart controller may prevent overpressurization of the storage tank during refill operations. For example, the smart controller may control the downline outlet pressure to a differential pressure of less than about 20 psi, and less than 10 psi in some embodiments While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A subsea smart electrical control unit comprising:
one or more mechanical interfaces;
a modular housing comprising a smart controller, one or more internal sensors, an electrical motor, a smart battery, and a gearbox;
a power supply and control unit; and
one or more external sensors configured to analyze and report the health of one or more of the mechanical interfaces, the modular housing, the power supply and control unit, and one or more end point units, wherein the one or more external sensors are configured to create local control loops for real time operation, adjustment, and optimization of the one or more end point units,
wherein the one or more internal sensors are configured to analyze and report the health of one or more of the smart controller, the electrical motor, and the gearbox.

2. The subsea smart electrical control unit of claim 1, where the one or more mechanical interfaces comprise at least one of a fixed mounting interface and a relocatable mounting interface.

3. The smart electrical control unit of claim 2, wherein the one or more mechanical interfaces are configured to connect to and operate the one or more end point units.

4. The smart electrical control unit of claim 3, where in the one or more end point units comprise at least one selected from the group consisting of pumps, compressors, metering systems, valves, regulators, chokes, and safety devices.

5. The smart electrical control unit of claim 1, wherein the smart controller is operably connected to the electrical motor.

6. The smart electrical control unit of claim 5, wherein the smart controller is operably connected to the gearbox.

7. The smart electrical control unit of claim 1, wherein the power supply and control unit comprises one or more of a smart battery, an umbilical, a power conditioning unit, and a control communications unit.

8. The smart electrical control unit of claim 7, wherein power is supplied to the smart electrical control unit from one or more of the umbilical and the smart battery in the power supply and control unit.

9. The smart electrical control unit of claim 7, wherein the power conditioning unit is configured to regulate an electrical supply to the smart controller.

10. The smart electrical control unit of claim 1, wherein the one or more external sensors are used with the smart controller to create one or more control loops.

11. A process for controlling a subsea smart electrical control unit, the subsea smart electrical control unit comprising:
one or more mechanical interfaces;
a modular housing comprising a smart controller, one or more internal sensors, an electrical motor, a smart battery, and a gearbox;
a power supply and control unit; and
one or more external sensors configured to analyze and report the health of one or more of the mechanical interfaces, the modular housing, the power supply and control unit, and one or more end point units;
the process comprising:
collecting operating data from the one or more external sensors and the one or more end point units,
calculating and performing in-situ analytics,
transmitting a health and a status of one or more of the mechanical interfaces, the modular housing, the power supply and control unit, and the one or more end point units; and
creating one or more local control loops for real time operation, adjustment, and optimization of the one or more end point units using the one or more external sensors.

12. The process of claim 11, wherein the in-situ analytics are selected from a group consisting of high-low limit exceedance, deviation from a set point or range, wear modelling, and deterioration modelling.

13. The process of claim 11, further comprising using one or more control loops comprising: on-off control, linear or non-linear feedback control loops, PID process control, feed-forward control strategies, artificial intelligence, fuzzy logic control, kalman filters, sliding mode control, dynamic programming, adaptive control, and economic optimization with dynamic control.

14. The process of claim 11, wherein the one or more end point units comprise at least one selected from the group consisting of pumps, compressors, metering systems, valves, regulators, chokes and safety devices.

15. The process of claim 11, wherein the step of calculating comprises using the one or more internal sensors to analyze and report the health of one or more of the smart controller, the electrical motor, and the gearbox.

16. The process of claim 11, further comprising analyzing and reporting the health of one or more of the mechanical interfaces, the modular housing, the power supply and control unit, and the one or more end point units using the one or more external sensors.

17. The process of claim 11, further comprising using the one or more external sensors with the smart controller to create the one or more local control loops.

* * * * *